2,695,859

1-CHLORO-3 BROMOPROPENE-1 AS A SOIL FUMIGANT AND METHOD OF USING SAME

Frederick B. Hilmer, Orinda, Calif., assignor to Shell Development Company, Emeryville, Calif., a corporation of Delaware No Drawing. Application July 28, 1952,
Serial No. 301,397

12 Claims. (Cl. 167—39)

The present invention relates to soil fumigants and to their use for the eradication of soil pests.

It is an object of this invention to provide a toxic agent which, when introduced into soil, will disinfect it of deleterious parasitic soil-borne fungi and bacteria microorganisms. Another object is to provide a soil-treating composition capable of killing nematodes, fungi, and weed seeds present in soils. A further object is to provide methods of treating soils and controlling various soil-inhabiting pests by means of the aforementioned toxic agent and compositions containing said agent.

It has now been found that 1-chloro-3-bromopropene-1 and compositions containing 1-chloro-3-bromopropene-1 are highly effective and outstanding agents for fumigating and disinfecting soils.

The compound 1-chloro-3-bromopropene-1 is obtainable by reacting 1,3-dichloropropene-1 with an alkali metal or alkaline earth metal bromide, thereby synthesizing the desired 1-chloro-3-bromopropene-1. As illustrative, 1,3-dichloropropene-1 was stirred under reflux conditions with a molecular equivalent of powdered solid anhydrous calcium bromide for about 30 hours. The reflux kettle temperature was about 110–115° C. Thereafter, the resultant solid mixture of calcium chloride and calcium bromide in the reaction mixture was filtered off. The resultant liquid filtrate was distilled. A 49% yield of 1-chloro-3-bromopropene-1, based on the initial amount of calcium bromide was obtained. A heart cut of the distillate, boiling between 130° C. and 133° C. at atmospheric pressure, analyzed as follows:

|  | Found, percent | Calculated, percent |
|---|---|---|
| Chlorine | 23.0; 22.7 | 22.8 |
| Bromine | 51.6; 51.8 | 51.4 |

A particular advantage of the present fungicidal agent is that it does not adversely affect the normal crop-growing properties of soil, even when used in amounts suitable for substantially entirely controlling fungi in the soil. Another advantage of the present agent is that it may be introduced into the soil without the necessity of thereafter sealing or covering the soil. Even when used in unsealed soil, the present agent is effectively and sufficiently retained therein and kills harmful soil fungi.

The fungicidal agent may be injected as such directly into the soil, or may be used in admixture with other suitable diluents or carriers. Some of the latter may be cooperative in action with the present agent in the sense of possessing fertilizing, growth retarding or toxic properties. Suitable carriers are hydrocarbon spray oils, emulsions of the latter with water, anhydrous ammonia, and finely-divided porous absorbents, such as activated carbon impregnated with the fungicide agent.

Of the above-mentioned methods of application of the present soil fumigant, there are three which have been particularly successful. These three methods are (1) injection of the fumigant, per se or in liquid solutions, (2) surface applications of water emulsions of the fumigant and (3) applications of the fumigant per se, or solutions thereof, by a so-called "drip technique."

Injection of the fumigant into the soil may be either intermittent or continuous. Intermittent injection is usually carried out by adding measured amounts of the fumigant into holes which have been made in the soil at measured intervals, e. g., one foot intervals. The holes are from about 6 to about 14 inches in depth and the quantities of fumigant placed in each hole are measured so that from about 50 to about 400 pounds of the 1-chloro-3-bromopropene-1 is applied per acre of soil. Under most conditions between about 100 and 200 pounds per acre will be satisfactory.

Continuous injection may be carried out by mechanical equipment designed for this purpose, one embodiment of which comprises injection with equipment attached to a plow so that the fumigant is introduced beneath the soil at the same time the soil is cultivated. The amounts utilized in continuous injection are substantially comparable to the amounts utilized in intermittent injection.

In some cases it may be particularly advantageous to utilize a means of application known as a split treatment, which comprises fumigation first with about half of the total fumigant to be applied, followed by a waiting period of several days, and then fumigation with the remainder of the fumigant. At the time of the second fumigation, the soil is turned over so that fungi or other organisms in the surface layers of the soil which may have escaped effective fumigation in the first treatment will be effectively eradicated in the later treatment.

The injection technique of application is effective in protecting the roots and stems of either young or mature plants from diseases and other forms of attack at 2 inches or more below the soil surface. A particular advantage of treatment by injection is that relatively longer lasting protection is obtained for plants in the treated soil.

The following are examples of the outstanding results obtained by injecting 1-chloro-3-bromopropene-1 into soil for fungicidal soil fumigation. In the following examples the 1-chloro-3-bromopropene-1 was utilized as a mixture of about 50 weight per cent of the active ingredient in other halogenated hydrocarbons (predominately 1,2-dichloropropane). This mixture will be referred to hereinafter as technical chlorobromopropene.

Example I

Farm land in Fresno County, California, was treated by injecting 20 gallons of technical chlorobromopropene per acre into the soil at a depth of about 8 inches. Approximately one month later, cotton was planted on the treated land and also on adjacent untreated land. At the end of the season the yield of cotton from the treated land was 666 pounds per acre greater than from the untreated land.

Example II

Farm land in Yakima County, Washington, was treated by injecting 20 gallons of technical chlorobromopropene per acre at a depth of about 6 inches. White Rose potatoes were planted on the treated land and also on adjacent untreated land. At harvest time, Verticillium wilt had substantially killed all of the potato vines on the untreated land whereas those vines on the treated land were still green and growing. The yield of potatoes from the treated land was 2800 pounds per acre greater than from the untreated land.

Example III

Land in the Salinas Valley near Watsonville, California, infected with Verticillium wilt and black root rot of strawberry was given a split treatment injection with technical chlorobromopropene at a rate of from 20 to 30 gallons per acre. The treated land and adjacent untreated land were thereafter planted to strawberries. The treatment gave an excellent control of black root rot and reduced the incidence of Verticillium wilt from greater than 65% down to 5%.

Example IV

Land in the San Joaquin Valley, near Modesto, California, infected with "replant disorder" of peach seedlings was treated by injecting technical chlorobromopropene at a rate of 30 gallons per acre. The treated land and adjacent untreated land were thereafter planted to peach tree seedlings. Five months later the average height of the seedlings on the treated plot was found to be about 79 cm., whereas the average height on the untreated plants was about 50 cm. The average diameter of the seedlings on the treated plot was about 12 cm. as compared with about 8 cm. on the untreated plot.

*Example V*

Land in the Salinas Valley, near Soledad, California, infected with *Phoma terrestris* (*Pyrenochaeta terrestris*), commonly known as the pink root of onions, was treated by injecting technical chlorobromopropene at the rate of from 20 to 30 gallons per acre. The treated land and adjacent untreated land were thereafter planted to Australian Brown onions. At harvest time the gross weight of onions per acre of treated land was about 4 times the gross weight of onions per acre of untreated land. The gross weight of commercially acceptable onions per acre of treated land was over 8 times the gross weight of such onions per acre of untreated land.

Another very effective means of application of the soil fumigant of the present invention is the application of a water emulsion sprinkled, sprayed, poured or otherwise applied upon the surface of the ground and allowed to soak into the soil. It is generally desirable to wait for about 7 to 10 days after application before planting the soil with crops. This method of application is particularly effective in controlling or killing weed seeds to a depth of 3 or 4 inches beneath the surface of the soil, lesion and root-knot nematodes to a depth of 6 to 12 inches beneath the surface of the soil, and pathogenic fungi such as Pythium, Rhizoctonia, Thielaviopsis, Fusarium and Pythophthora at depths of from 6 to 12 inches beneath the surface of the soil.

In general, application rates are of the order of magnitude of about 1 gallon of 1-chloro-3-bromopropene-1 per 100 gallons of water applied to about 100 square yards of soil. It has been found that the depth of penetration may be controlled to some extent by the amount of water present in the emulsion, more water giving deeper penetration.

The application of water emulsions of the fumigant to the surface of the soil is particularly effective for seed bed treatment, especially seed beds for tobacco, tomatoes, celery, and other vegetables, ornamentals, etc.

For use in surface application of emulsions of 1-chloro-3-bromopropene-1, it has been found to be advantageous to prepare an emulsifiable concentrate of the soil fumigant which may be readily emulsified in water at or near the location of ultimate application to the soil. The compound 1-chloro-3-bromopropene-1 is relatively difficult to emulsify, even with very large quantities of emulsifier, and the stability of any such emulsions formed is generally rather poor. It has been found, however, that if the compound is diluted somewhat with a miscible solvent (e. g., a hydrocarbon solvent such as kerosene or xylene, a halogenated hydrocarbon, especially a saturated halogenated hydrocarbon such as 1,2-dichloropropane or carbon tetrachloride, or numerous other materials which will be readily apparent to those skilled in the art), then the solution may be readily emulsified in water to form satisfactorily stable emulsions with the use of reasonable amounts of emulsifiers. In general, the concentration of 1-chloro-3-bromopropene-1 in the concentrate will range from about 15 or 20% to as high as 50%, or even 70% or 80%. The amount of emulsifier required will vary, depending upon the particular emulsifier or emulsifiers chosen, but will generally range from as low as 2 or 3% by weight to as high as 10 or 15%. As indicated above, the higher concentrations of the 1-chloro-3-bromopropene-1 will require larger quantities of emulsifier to produce satisfactory emulsification.

The emulsifiers utilized in the emulsifiable concentrates may be either cationic, anionic, or non-anionic. In general, the cationic emulsifiers are preferred. Examples of suitable emulsifiers are sodium petroleum sulfonates, mixtures of fatty acid esters of polyethylene glycols, aromatic polyethylene glycol ethers, polyoxyethylene lauryl alcohols, dimeric dialkylphenoxypolyethoxy ethanols, glyceryl phthalic alkyd resins, polymeric condensation products of alkylene groups and aliphatic amides, heptadecyl glyoxalidine salts, etc.

The following is an example of the excellent results obtained by the treatment of soil with water emulsions of the above-described emulsifiable concentrates:

*Example VI*

Sugar beet seed beds were treated (prior to planting) with an emulsion prepared with 1 pint of 38% technical chlorobromopropene in kerosene concentrate emulsified in 12½ gallons of H₂O and applied to 100 square feet of seed bed. A second seed bed was treated similarly except that 1 quart of the concentrate was emulsified in 12½ gallons of water and applied to 100 square feet of seed bed. All weed seeds were killed in the treated plots. The plot treated with 1 pint of emulsifiable concentrate gave a yield of about 66 seedlings per 100 seedlings planted. The plot treated with 1 quart of the concentrate gave a yield of 95 seedlings per 100 seedlings planted. An adjacent untreated plot gave a yield of only 2½ seedlings per 100 seedlings planted. The fungus disease which was controlled in the above plots was *Pythium ultimum*.

The so-called "drip technique" of application of the present soil fumigant is one in which the compound per se, or a solution thereof, is placed in the seed row along with the seeds at the time of planting. The advantages of this method of application are that relatively small quantities of the fumigant are required, and that the cost of a pre-treatment of the soil is eliminated in that the fumigation and planting operations are carried out at the same time. In general, from about 0.02 to about 0.20 ml. of 1-chloro-3-bromopropene-1 are placed in the soil per running foot of seed row. This type of treatment has been particularly effective in combating pre-emergence seed and seedling rot, and pre-emergence damping-off diseases such as caused by *Pythium ultimum* and *Rhizoctonia solani* on peas, sugar beets, cotton, lima beans and honeydew melons; hypocotyl rot and other types of stem attack including post emergence damping-off caused by Rhizoctonia and Fusarium on peas, pinto beans and lima beans; and root attack such as parasitism of root laterials and feeder roots caused by Fusarium, Pythium, Pyrenochaeta and Rhizoctonia on peas, pinto beans, tomatoes and onions.

Because of the small quantities of fumigant required in this method of soil treatment, and because of the inherent difficulty in controlling the uniform distribution of such small quantities, it is often desirable to utilize he 1-chloro-3-bromopropene-1 in solutions rather than n undiluted form. Suitable solvents for this purpose are, for example, isooctane, naphtha, kerosene, dichloropropane, carbon tetrachloride and other halogenated hydrocarbons, acetone, xylene, isopropyl alcohol, and the like. In general, relatively volatile diluents are preferred, since the use of heavy solvents tends to increase the phytotoxicity of the active ingredient toward the crops planted in the treated soil.

As illustrative of results obtained by the application of the technique described immediately above, the following examples are presented.

*Example VII*

Soil infected with root-pruning disease of peas was treated by running a total of 0.12 ml. of technical chlorobromopropene per foot of seed row into the soil, 2 inches on either side of the seed row at the time of planting the peas. This treatment resulted in a 60% increase in total plant weight over plant weight obtained in adjacent untreated soil.

*Example VIII*

Soil infected with damping-off disease of sugar beets caused by Pythium and Rhizoctonia was treated with 0.12 ml. of technical chlorobromopropene per linear foot of seed row at the time of planting the sugar beets. This treatment resulted in a doubled stand (i. e., twice as many plants survived), on the treated soil as compared with the stand on an untreated plot.

*Example IX*

Rhizoctonia stem attack upon lima beans was controlled by dripping 0.08 ml. of technical chlorobromopropene per linear foot of seed row. Whereas only 30% of the seeds planted in an untreated control plot, 85% of the seeds planted survived in the treated plot.

From the foregoing discussion it may be seen that the application rates of 1-chloro-3-bromopropene-1 will vary quite markedly with the type of application utilized, the particular disease to be controlled and the crop to be planted in the treated soil. The above illustrations and disclosure merely serve as guides in determining suitable application rates for particular crops, diseases and conditions.

A comparison of the soil fungicidal effectiveness of other somewhat similar halogenated unsaturated hydrocarbons was made as follows:

Cultures of the fungi *Fusarium solani pisi, Phytophthora cactorum, Rhizoctonia solani, Verticillium alboatrum,* and *Sclerotinia sclerotiorium* were separately introduced aseptically into sterile Pyrex glass tubes, after which both ends of each tube were loosely plugged with non-absorbent cotton. Only one fungal test unit was placed in each Pyrex tube. This method provided unobstructed diffusion of gases and at the same time prevented contamination of the fungal test unit by other soil microorganisms. The Pyrex tubes (cartridges) were next placed into soil disposed in one-gallon size glazed earthenware crocks that were open at the top. The "cartridges" were inserted in a horizontal position in the lower third of the crocks. The soil used was ordinary field soil, and was screened only to remove large particles of soil and stones. Test-compounds (mentioned in the following table) were then introduced into the soil at concentrations of 0.01, 0.05, 0.1, 0.3, 0.5 and 1.0 milliliter by dripping such an amount onto cotton at the bottom of a 3-inch deep hole in the soil, after which the hole was filled in with adjacent soil and tamped lightly. These unsealed crocks of soil were then held at temperatures of from about 60° F. to about 100° F. for 72 hours. After this testing period, the "cartridges" were removed from the soil, brushed and tapped to remove adhering soil, and taken to the laboratory where their contents were plated on nutrient agar plates. These plates were incubated at 20° C. and then examined microscopically at the end of three days for fungal growth. The relative effectiveness of a given test-compound was determined by the lowest concentration of the test-compound required to kill the fungi, i. e., stop all growth. From these tests, the following results were obtained

| Test-Chemical | Minimum lethal dosage of test chemical in ml. per million ml. of soil for all specified test fungi |
| --- | --- |
| 1,3-dichloropropene-1 | ineffective at 250. |
| 2,3-dichloropropene-1 | Do. |
| 3-chloro-2-chloromethyl-1-butene | Do. |
| chlorinated monochlorobutenes | Do. |
| 2-chloro-3-iodo propene-1 | ineffective at 200. |
| 3-chloro-3-iodo propene-1 | Do. |
| chloropicrin | ineffective at 125. |
| 1-chloro-3-bromopropene-1 | completely effective at 25. |

This application is a continuation-in-part of my co-pending application, Serial No. 20,823, filed April 13, 1948, and now abandoned, which was in turn a continuation-in-part of application, Serial No. 492,961, filed June 30, 1943, now abandoned and Serial No. 500,457, filed August 28, 1943, now abandoned.

I claim as my invention:

1. A method for protecting crops from attack by parasitic soil pathogens of the plant kingdom which comprises contacting said pathogens in soils with an effective toxic quantity of 1-chloro-3-bromopropene-1 and thereafter planting said soil to a crop which is subject to attack by the species of pathogen eradicated.

2. A method for protecting crops from attack by parasitic soil pathogens of the plant kingdom which comprises contacting said pathogens in soils with an effective toxic quantity of 1-chloro-3-bromopropene-1.

3. A soil fumigant comprising a minor amount but soil fungicidal amount of 1-chloro-3-bromopropene-1 as the essential active fumigating agent, incorporated with a finely-divided solid adsorbent horticultural carrier having the property of effecting controlled and slow release of said fumigating agent therefrom.

4. A soil fumigant composition comprising 1-chloro-3-bromopropene-1 and a minor amount of an emulsifier adapted to promote emulsification of said 1-chloro-3-bromopropene-1 in water.

5. A soil fumigant composition comprising 1-chloro-3-bromopropene-1 dissolved in an organic solvent miscible with said 1-chloro-3-bromopropene-1 and a minor amount of an emulsifier adapted to promote the emulsification of said 1-chloro-3-bromopropene-1 and solvent therefor in water.

6. A soil fumigant composition comprising 1-chloro-3-bromopropene-1 and an organic solvent miscible with said 1-chloro-3-bromopropene-1.

7. A soil fumigant composition comprising 1-chloro-3-bromopropene-1 dissolved in a saturated halogenated hydrocarbon solvent therefor.

8. A soil fumigant composition comprising 1-chloro-3-bromopropene-1 dissolved in a chlorinated hydrocarbon solvent.

9. A soil fumigant composition comprising 1-chloro-3-bromopropene-1 and 1,2-dichloropropane.

10. A soil fumigant composition comprising 1-chloro-3-bromopropene-1 and a hydrocarbon solvent therefor.

11. A soil fumigant composition comprising 1-chloro-3-bromopropene-1 and kerosene.

12. A soil fumigant composition comprising 1-chloro-3-bromopropene-1, a kerosene hydrocarbon solvent for said 1-chloro-3-bromopropene-1, a halogenated hydrocarbon diluent for said 1-chloro-3-bromopropene-1 and a minor amount of an emulsifier adapted to promote emulsification of said 1-chloro-3-bromopropene-1, said kerosene solvent, and said halogenated hydrocarbon diluent in water.

References Cited in the file of this patent

UNITED STATES PATENTS

| Number | Name | Date |
| --- | --- | --- |
| 2,547,822 | Johnson | Apr. 3, 1951 |

OTHER REFERENCES

Frear: Chemistry of Insecticides and Fungicides, D. Van Nostrand Co., Inc., N. Y., pages 120 to 121, 184 to 191 (1942).